(12) United States Patent
McLean

(10) Patent No.: US 6,758,304 B1
(45) Date of Patent: Jul. 6, 2004

(54) TUNED HELMHOLTZ RESONATOR USING CAVITY FORCING

(75) Inventor: Ian R. McLean, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 09/656,808

(22) Filed: Sep. 7, 2000

Related U.S. Application Data

(60) Provisional application No. 60/154,391, filed on Sep. 16, 1999.

(51) Int. Cl.[7] .......................... F01N 1/06; G10K 11/16; F02M 35/12
(52) U.S. Cl. ...................... 181/206; 181/214; 381/71.5; 381/73.1; 123/184.57
(58) Field of Search ............................... 181/206, 214, 181/229, 240; 381/353, 71.2, 71.5, 71.8, 73.1; 123/184.53, 184.57, 184.56

(56) References Cited

U.S. PATENT DOCUMENTS

| | | | |
|---|---|---|---|
| 4,546,733 A | * 10/1985 | Fukami et al. | 123/184.57 |
| 5,229,556 A | * 7/1993 | Geddes | 181/206 |
| 5,377,629 A | * 1/1995 | Brackett et al. | 123/184.56 |
| 5,446,249 A | * 8/1995 | Goodman et al. | 181/206 |
| 5,446,790 A | * 8/1995 | Tanaka et al. | 181/206 |
| 5,571,239 A | 11/1996 | Kameda et al. | |
| 5,748,749 A | * 5/1998 | Miller et al. | 381/71.5 |
| 5,771,851 A | * 6/1998 | McLean | 123/184.57 |

FOREIGN PATENT DOCUMENTS

| | | | |
|---|---|---|---|
| EP | 08185189 | 7/1966 | |
| EP | 04209961 | 7/1992 | |
| JP | 05098927 A | * 4/1993 | F01N/1/00 |
| WO | WO 9309334 A1 | * 5/1993 | F01N/1/06 |

* cited by examiner

*Primary Examiner*—Robert Nappi
*Assistant Examiner*—Edgardo San Martin

(57) ABSTRACT

A Helmholtz resonator includes a chamber at least partially defining a cavity. The chamber has a neck which defines a passage that is in fluid communication with the cavity. The chamber and the neck produce a passive response to a sound wave produced by the internal combustion engine. The sound wave negatively effects engine performance. An active resonator is disposed within the chamber. The active resonator produces a forced response for supplementing the passive response and increasing the band width of the noise attenuating pressure wave. The Helmholtz resonator is in fluid communication with a portion of an air induction system that defines a passageway that carries the sound wave. A driver is connected to the active resonator, which is preferably a loud speaker, to drive the loud speaker and produce the forced response. The driver preferably utilizes a signal source, such as an engine speed signal, to synchronize the forced response with the engine speed. A phase compensator synchronizes the forced response with the sound wave, and an amplifier amplifies the signal to drive the loud speaker.

17 Claims, 1 Drawing Sheet

TUNED HELMHOLTZ RESONATOR USING CAVITY FORCING

This application claims the benefit of Provisional application No. 60/154,391 field Sep. 16, 1999.

BACKGROUND OF THE INVENTION

This invention relates to a noise attenuation device for an air induction system, more particularly, the invention relates to a Helmholtz resonator for producing a forced response.

Internal combustion,engines produce undesirable induction noise which adversely affects the output torque and volumetric efficiency of the engine. The induction noise produced by the engine depends on the particular engine configuration and is affected by such factors as the number of cylinders, the volume and shape of the intake manifold plenum and intake runners, and other induction system parameters. The induction noise is caused by a pressure wave that travels away from the combustion chamber toward the inlet of the air induction system. The induction noise may be reduced and the engine performance improved by producing a wave traveling in: the direction of the combustion chamber 180° out of phase of the noise wave. To this end, noise attenuation devices have been developed.

A Helmholtz resonator is one widely used noise attenuation device. The Helmholtz resonator produces a pressure wave that counteracts primary engine order noise waves, which have the greatest negative impact on engine performance. Helmholtz resonators typically provide a passive response targeted at a particular band width of noise. Because the Helmholtz resonator typically provides a passive response, losses occur which decrease the overall effectiveness of the resonator by producing a pressure wave having a narrower bandwidth and smaller amplitude than desired. Variable Helmholtz resonators have been developed, which vary the volume of the resonator to vary the band width at which the resonator attenuates noise. However, these variable resonators do not address the passive losses associated with the Helmholtz resonator. Accordingly, it is desirable to widen the band width of a Helmholtz resonator to further attenuate noise and increase the performance of the engine.

SUMMARY OF THE INVENTION AND ADVANTAGES

The present invention provides a Helmholtz resonator including a chamber at least partially defining a cavity. The chamber has a neck which defies a passage that is in fluid communication with the cavity. The chamber and the neck produce a passive response to a sound wave produced by the internal combustion engine. The sound wave negatively effects engine performance. An active resonator is disposed within the chamber. The active resonator produces a forced response for supplementing the passive response and increasing the band width of the noise attenuating pressure wave.

The Helmholtz resonator is in fluid communication with a portion of an air induction system that defines a passageway that carries the sound wave. A driver is connected to the active resonator, which is preferably a loud speaker, to drive the loud speaker and produce the forced response. The driver preferably utilizes a signal source, such as an engine speed signal, to synchronize the forced response with the engine speed. A phase compensator synchronizes the forced response with the sound wave, and an amplifier amplifies the signal to drive the loud speaker.

Accordingly, the present invention increases the band width of the passive response of the Helmholtz resonator to more effectively attenuate noise and increase engine performance.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
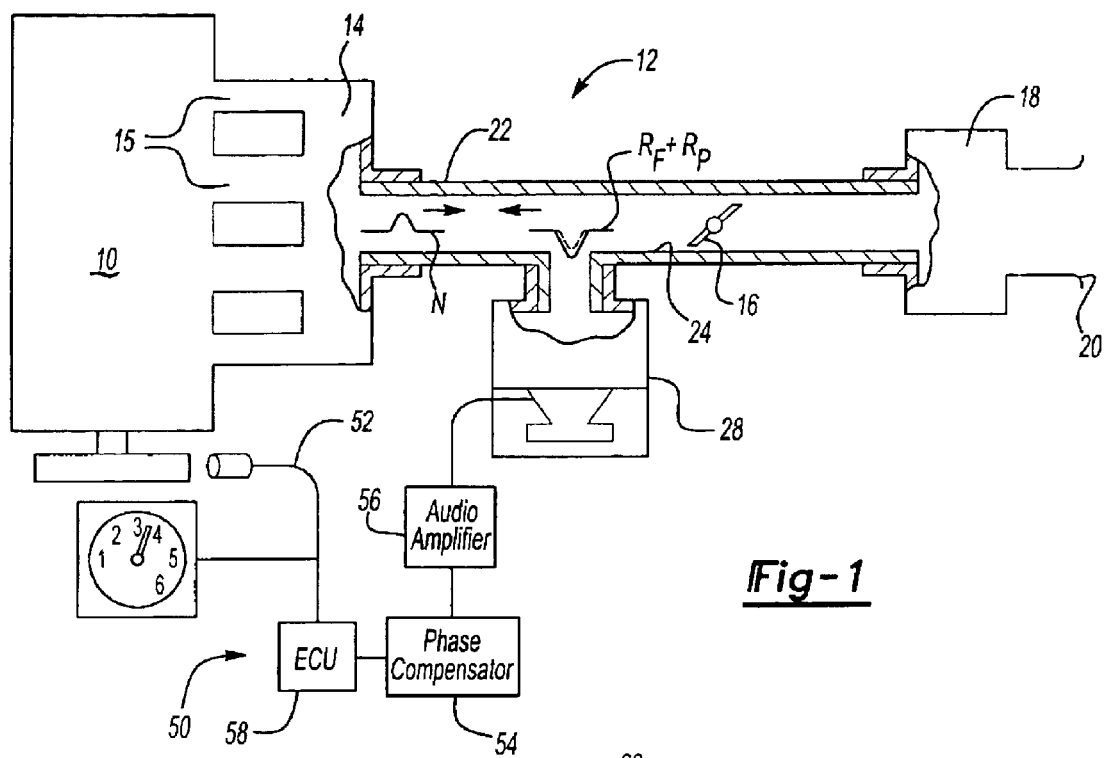
FIG. 1 is a schematic view of an internal combustion engine and induction system of the present invention.

An internal combustion engine 10 is shown in FIG. 1. An air induction system 12 provides air to the engine 10 for mixture with fuel. The air/fuel mixture is burned in a combustion chamber. Air is provided from the atmosphere through an air intake 20 that feeds air through a filter box 18. The air travels along passageway 24 through a throttle body 16 which controls the amount of air that travels through the passageway 24 to the engine 10. The air is fed to an intake manifold 14 which then distributes the air to the combustion chambers through runners 15. During the combustion process noise pressure waves N are produced in the induction system 12 which reflect back into the combustion chambers and negatively effect engine performance.

A Helmholtz resonator 28 is shown in fluid connection with the passageway 24 to produce noise attenuating pressure waves which at least partially cancel the noise pressure waves N. Primary order engine noise, or the most undesirable engine noise, is related to the speed of the engine. Helmholtz resonators are designed to attenuate noise at the primary order. The frequency at which the primary order engine noise occurs is: number of cylinders/2×engine speed/60.

Figure 2:
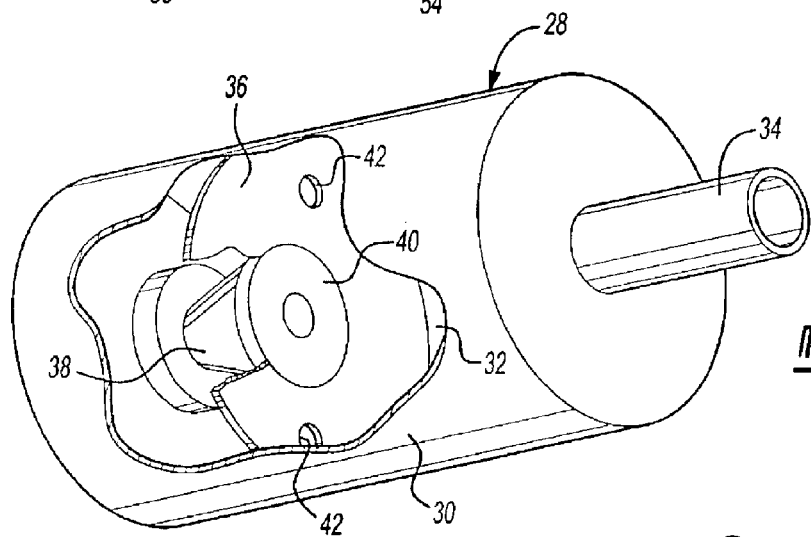
FIG. 2 is a perspective view of the Helmholtz resonator of the present invention.

The Helmholtz resonator which is shown in FIG. 2 includes a chamber 30 defining a cavity 32. A neck 34, which is shown as a tubular structure, extends from the chamber 30 and is in fluid communication with the cavity 32. The volume defined by the cavity 32 and the area of the neck 34 largely effect the band width of the noise attenuating frequency. The Helmholtz resonator 28 produces a passive response $R_p$ that is approximately 180° out of phase from the noise wave N, shown in FIG. 3. The passive response $R_p$ has a bandwidth narrower and an amplitude smaller than desired.

The resonator 28 is shown arranged between the throttle body 16 and the intake manifold 14. However, it is to be understood that the resonator 28 may be arranged anywhere along the induction system 12. Preferably, the resonator 28 is arranged between the throttle body 16 and the intake manifold 14 because the largest portion of the noise pressure wave is reflected from the throttle body 16 back to the intake manifold 14. With the resonator 28 arranged as shown in FIG. 1, a larger portion of the noise pressure wave may be attenuated by the resonator 28.

Figure 3:
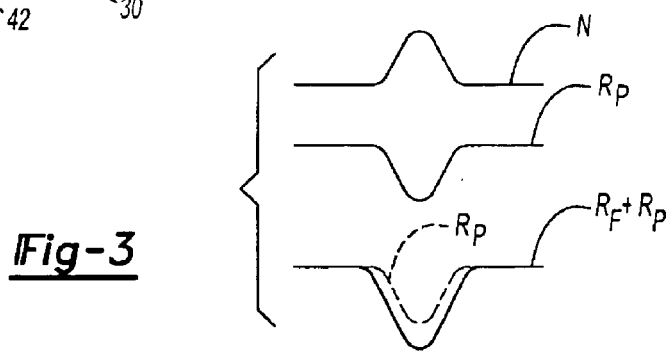
FIG. 3 is a graphical view of pressure waves.

The present invention increases the band width of the resonator 28 by producing a forced response $R_f$ shown in FIG. 3. The forced response supplements the passive response $R_p$ and together provide a wider band width and higher amplitude than the passive response from the Helmholtz resonator 28. As a result, a larger portion of the noise pressure wave may be attenuated. To this end, the present invention utilizes a active resonator, preferably a loud speaker 38, to produce the forced response. The chamber 30 includes a flange 36 to which the loud speaker 38 is attached. The flange 36 has an opening within which the loud speaker diaphragm 40 is disposed. The loud speaker 38 is driven by a driver 50 that drives the diaphragm 40 to produce a pressure wave that supplements the passive response pressure wave $R_p$. That is, the forced response $R_f$ is in phase with the passive response $R_p$. The flange 36 includes pressure equalization ports 42 that equalizes the pressure on either side of the flange 36 to permit consistent operation of the resonator 28 of the present invention in various altitudes and changing atmospheric pressures. The equalization ports 42 are small enough to prevent pressure waves from exiting the cavity 32 through the equalization ports 42 so that the noise attenuating and pressure wave will not escape but will be directed to the noise wave. Preferably the pressure equalization ports 42 are about 1/8 inch in diameter.

Since the Helmholtz resonator 28 is designed to attenuate noise produced at the primary engine order, the driver 50 preferably includes a signal source 52 that senses the speed of the engine. Such signals are commonly produced by proximeters that read notches on a timing gear. The speed signal is used by an ECU 58 for devices such as the tachometer and engine control. The signal source 52 is sent to a phase compensator 54 that adjusts the sinusoidal output from the signal source 52 so that it is approximately 180° out of phase with the noise pressure wave. The phase compensator 54 adjusts for such parameters as the speaker response, the volume response of the Helmholtz resonator, and the neck response of the Helmholtz resonator. These parameters may be determined through experimentation during the engine development process. An audio amplifier 56 amplifies the signal from the phase compensator 54 which is typically a low voltage signal. The signal from the audio amplifier 56 drives the loud speaker 38 to produce the forced response. The forced response $R_f$ and passive response $R_p$, which are of wider band width and greater amplitude, are radiated back to the engine 10 to increase the engine performance.

While a branch Helmholtz resonator is shown it is to be understood that the present invention may also be used with an inline Helmholtz resonator. The invention has been described in an illustrative manner, and it is to be understood that the terminology that has been used is intended to be in the nature of words of description rather than of limitations Obviously, many modifications and variations of the present invention are possible in light of the above teachings. It is, therefore, to be understood that within the scope of the appended claims the invention may be practiced otherwise than as specifically described.

What is claimed is:

1. An induction noise attenuation system for a combustion engine comprising:
   a portion of an air induction system defining a passageway arranged between an intake manifold and a throttle body carrying a sound wave;
   a Helmholtz resonator having a chamber at least partially defining a cavity and a neck in said chamber fluidly connecting said portion of said air induction system and said cavity, said chamber and said neck producing a passive response to said sound wave;
   an active resonator disposed within said chamber; and
   a driver connected to said active resonator producing a signal for driving said active resonator and producing a forced response for supplementing said passive response.

2. The Helmholtz resonator according to claim 1, wherein said neck is a tubular structure extending from said chamber.

3. The system according to claim 1, wherein said driver includes a signal source that detects a speed of the combustion engine for synchronizing said forced response relative to said speed.

4. The system according to claim 3, wherein said signal source is engine RPM.

5. The system according to claim 3, wherein said driver includes a phase compensator for synchronizing said forced response approximately 180° out of phase with said sound wave.

6. The system according to claim 3, wherein said driver includes an amplifier for amplifying a signal from said signal source.

7. The system according to claim 1, wherein said active resonator is a loudspeaker.

8. The Helmholtz resonator according to claim 7, wherein said loudspeaker is a woofer.

9. The Helmholtz resonator according to claim 7, wherein said chamber includes a flange with said loudspeaker supported thereon, and said loudspeaker having a diaphragm disposed within an opening in said flange for producing said forced response.

10. The Helmholtz resonator according to claim 9, wherein said flange includes at least one pressure equalization port there through in fluid communication with said cavity.

11. The Helmholtz resonator according to claim 10, wherein said flange is arranged opposite said neck.

12. A method of attenuating noise in an induction system comprising:
    a) sensing an engine speed;
    b) producing a phase compensated engine speed signal;
    c) driving a loudspeaker with the phase compensated engine speed signal; and
    d) propagating a sound wave with the loudspeaker to attenuate the noise in the induction system.

13. The method according to claim 12, further including the step of:
    e) amplifying the engine speed signal.

14. The method according to claim 12, further including the step of:
    f) propagating a passive sound wave with a Helmholtz resonator, wherein step d) supplements the passive sound wave.

15. The method according to claim 14, wherein step b) includes determining a loudspeaker response.

16. The method according to claim 14, wherein step b) includes determining a Helmholtz resonator cavity response.

17. The method according to claim 14, wherein step b) includes determining a Helmholtz resonator neck response.

* * * * *